United States Patent
Choi et al.

(10) Patent No.: US 8,406,298 B2
(45) Date of Patent: Mar. 26, 2013

(54) METHOD AND APPARATUS TO TRANSMIT DATA ON PLC NETWORK BY AGGREGATING DATA

(75) Inventors: Jun-hae Choi, Seongnam-si (KR);
Seung-gi Chang, Seoul (KR);
Chang-yeul Kwon, Yongin-si (KR);
Joon-hee Lee, Gunpo-si (KR); Ju-han Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1350 days.

(21) Appl. No.: 11/643,799

(22) Filed: Dec. 22, 2006

(65) Prior Publication Data
US 2007/0242745 A1 Oct. 18, 2007

(30) Foreign Application Priority Data
Mar. 3, 2006 (KR) .................. 10-2006-0020639

(51) Int. Cl.
*H04N 11/02* (2006.01)
*H04J 1/16* (2006.01)

(52) U.S. Cl. .............. 375/240.15; 375/240.26; 709/218; 709/232; 370/235; 370/474

(58) Field of Classification Search ............ 375/240.26; 341/67; 370/254–395
See application file for complete search history.

(56) References Cited

U.S. PATENT DOCUMENTS

| | | | | |
|---|---|---|---|---|
| 4,991,133 A * | 2/1991 | Davis et al. | ................... | 709/234 |
| 7,131,048 B2 * | 10/2006 | Suzuki et al. | ................. | 714/748 |
| 7,293,035 B2 * | 11/2007 | Hsu et al. | .............................. | 1/1 |
| 7,450,646 B2 * | 11/2008 | Kurauchi | ................ | 375/240.26 |
| 7,590,124 B2 * | 9/2009 | O'Mahony | ............... | 370/395.64 |
| 7,609,697 B2 * | 10/2009 | Nishida et al. | ................. | 370/394 |
| 7,898,980 B2 * | 3/2011 | Kim et al. | ..................... | 370/254 |
| 7,953,115 B2 * | 5/2011 | Nataga et al. | .................. | 370/474 |
| 2005/0259613 A1 * | 11/2005 | Garudadri et al. | ............ | 370/328 |
| 2007/0126612 A1 * | 6/2007 | Miller | .............................. | 341/67 |
| 2007/0140261 A1 * | 6/2007 | Wang et al. | .............. | 370/395.42 |
| 2007/0242745 A1 * | 10/2007 | Choi et al. | ..................... | 375/240 |

OTHER PUBLICATIONS

A parallel architecture for network control and mobility tracking in wireless systems Asthana, A.; Krzyzanowski, P.. Wireless Personal Communications 4. 2: 237-56. Kluwer Academic Publishers. (Mar. 1997).*

A successively refinable lossless image-coding algorithm Avcibas, I.; Memon, N.; Sankur, B.; Sayood, K.. IEEE Transactions on Communications 53. 3: 445-52. IEEE. (Mar. 2005).*

* cited by examiner

*Primary Examiner* — William C Vaughn, Jr.
*Assistant Examiner* — Luis M Perez
(74) *Attorney, Agent, or Firm* — Stanzione & Kim, LLP

(57) ABSTRACT

A method and apparatus to efficiently transmit data. The method and apparatus effectively aggregate data and transmit the data in a high-speed power line communication (PLC) network. The method of transmitting the data includes combining each of at least one or more data units transferred from an upper layer, with a field to indicate attribute information of the data unit, dividing the combined data units and fields into frame blocks of an identical size, and aggregating the divided frame blocks and transferring the aggregated frame blocks as one frame to a PHY layer. In this way, data units of a variety of types and sizes transferred from the upper layer are aggregated and transmitted as the one frame.

11 Claims, 9 Drawing Sheets

FIG. 8A    MAC HEADER
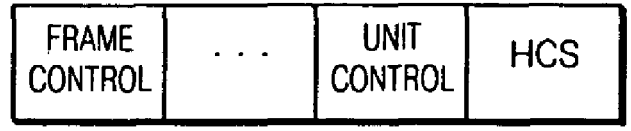
FIG. 8B    FRAME CONTROL FIELD
FIG. 8C    UNIT CONTROL FIELD
① WHEN UNIT CONTROL TYPE = "0" (FRAGMENTATION CONTROL TYPE)
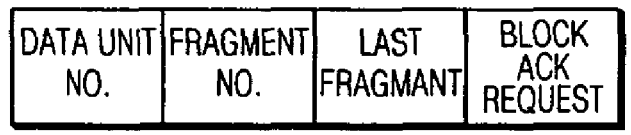
② WHEN UNIT CONTROL TYPE = "1" (AGGREGATION CONTROL TYPE)
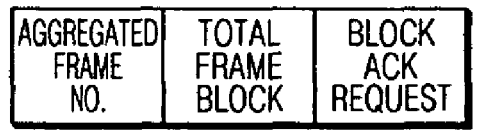

METHOD AND APPARATUS TO TRANSMIT DATA ON PLC NETWORK BY AGGREGATING DATA

CROSS-REFERENCE TO RELATED APPLICATIONS

This application claims priority under 35 U.S.C. §119(a) from Korean Patent Application No. 10-2006-0020639, filed on Mar. 3, 2006, in the Korean Intellectual Property Office, the disclosure of which is incorporated herein in its entirety by reference.

BACKGROUND OF THE INVENTION

1. Field of the Invention

The present general inventive concept relates to a method and apparatus to efficiently transmit data and more particularly, to a method and apparatus to effectively aggregate data and transmit the data in a high-speed power line communication (PLC) network.

2. Description of the Related Art

When data is transmitted through a PLC network, data flows through a plurality of layers. FIG. 1 is a schematic diagram of a path along which data is transmitted through a plurality of layers in a PLC network.

Data transmitted by a transmitter connected to the PLC network arrives at an upper layer through a PHY layer (physical layer) and a media access control (MAC) layer, and then, conversely, the data is received by a data receiver again through the MAC layer and the PHY layer. In this process, the MAC layer receives the data transferred from one or more upper layers. However, in this case, data units of a variety of types and sizes may be transferred from one upper layer or from a plurality of upper layers. Here, the upper layers may include an Internet protocol (IP) stack of a transmission control protocol/user datagram protocol/Internet protocol (TCP/UDP/IP) or a non-IP stack. Here, a 'data unit' is a unit of data that is transferred through an interface from an upper layer, such as a transport (TS) packet.

In the conventional PLC network, a variety of applications (or a variety of data units) are transferred to the MAC layer from a plurality of upper layers, and thus interfaces corresponding to the respective applications also become increasingly diversified. Accordingly, the data units of the variety of types and sizes are transferred to the MAC layer through the variety of interfaces. Examples of the variety of interfaces include a direct TS interface, a universal serial bus (USB) interface, an IEEE 1394 interface, an IEEE 802.3 interface, a serial interface, and iso-asynchronous interface.

When the data units of the variety of types and sizes are transferred to the MAC layer, if the data units are transmitted individually, frequent overheads can occur. That is, if each of the data units transferred to the MAC layer from an upper layer or the PHY layer is transmitted individually in an individual frame, an ACK is individually generated in the frame corresponding to the data unit, thus causing an overhead. In addition, header information, padding information, and cyclic redundancy check (CRC) information for each layer in the frame corresponding to each data unit are generated, and these may also cause overheads. Accordingly, in order to minimize a transmission time required for the overheads, and to secure a better throughput even when an error occurs during transmission, it is necessary to effectively aggregate data units transferred to the MAC layer and transfer the aggregated data units at a time.

An effort has been made to aggregate an appropriate number of data units transferred to the MAC layer from upper layers and transfer the data units to a PHY layer.

FIG. 2 is a diagram illustrating a conventional method of aggregating a predetermined number of data units transferred to a MAC layer from upper layers and transferring the aggregated data units to a PHY layer.

However, as illustrated in FIG. 2, the conventional method considers only a case where data units transferred to the MAC layer from upper layers have an identical size. That is, according to the conventional method, data units having identical sizes transferred from upper layers are divided into frame blocks (FB) having the same size as that of the data unit, and a delimiter containing information on the frame block is combined with each frame block. Then, the frame blocks combined with the delimiters are aggregated to form one frame and this frame is transferred to a PHY layer.

For example, in a moving picture experts group (MPEG)-2 TS, only packets (data units) having identical sizes of 188 bytes are transferred from upper layers to a MAC layer. Accordingly, these packets can be divided into frame blocks of 188 bytes, the same size as that of the packets, and these frame blocks can be aggregated to form one frame and this frame can be transferred to a PHY layer.

However, this conventional method has the following problems.

First, when a variety of types and sizes of data units are transferred to a MAC layer, they cannot be efficiently aggregated and transmitted. That is, when the data units have a variety of sizes, one whole data unit may be included in one frame block, but two or more frame blocks may be needed for one data unit. That is, since a data unit is not the same size as a frame block, it is difficult for an idealistic case where one data unit corresponds to one frame block, to occur. Accordingly, after a data unit is inserted into a frame block, a remaining empty part exists in the frame block. In this empty part, another data unit may be inserted or it may be left empty. Accordingly, when a variety of types and sizes of data units are aggregated and transmitted at a time according to the conventional technology, complexity of implementation increases or implementation itself may become impossible.

Secondly, when a variety of types and sizes of data units are aggregated and transmitted at the same time according to the conventional technology, the boundary and size of each data unit included in the frame block, the number of data units included in the frame block, the number of each data unit included in the frame block, and other information as well as basic information, such as the number of the frame block and cyclic redundancy check (CRC) information should be included in the delimiter containing information on a frame block. Accordingly, the quantity of information that should be included in the delimiter increases substantially.

Thirdly, as the types of upper layers to which a data unit is to be transferred increase in order to increase types and sizes of data units, the processing in a MAC layer becomes more complicated.

Accordingly, the conventional method causes many problems when a variety of types and sizes of data units to be transferred from a variety of upper layers are to be effectively aggregated and transmitted.

SUMMARY OF THE INVENTION

The present general inventive concept provides a data transmission method and apparatus by which when a variety of types and sizes of data units are transmitted in a high-speed power line communication (PLC) network, the data units are transmitted more efficiently, and when an error occurs in the transmission of the data, retransmission is efficiently requested and executed such that throughput can increase and quality of service (QoS) can be enhanced.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of transmitting data, the method including combining each of one or more data units transferred from an upper layer, with a field to indicate attribute information of the data unit, dividing the combined data units and fields into frame blocks of an identical size, and aggregating the divided frame blocks and transmitting the aggregated frame blocks as one frame to a PHY layer.

The attribute information of the data unit may be a type of the data unit, and types of the t one or more data units may be different from each other.

The attribute information of the data unit may be a size of the data unit, and sizes of the one or more data units may be different from each other.

The attribute information of the data unit may be a tagged time stamp (TTS) to indicate time related information of the data unit, and TTSs of the one or more data units may be different from each other.

The combining of the data unit with the field to indicate the attribute information of the data unit may be performed in a convergence layer, and the dividing of the combined data units and fields into frame blocks of identical size, the aggregating of the divided frame blocks, and the transmitting of the aggregated frame blocks as the one frame to the PHY layer may be performed in a media access control (MAC) layer.

The dividing of the combined data units and fields into the frame blocks of the identical size may include combining a delimiter to indicate attribute information of each frame block to the each frame block.

The aggregating of the divided frame blocks and the transmitting of the aggregated frame blocks as the one frame to the PHY layer may include combining a MAC header including control information for the frame, with the frame.

The foregoing and/or other aspects and utilities of the present general inventive concept may also be achieved by providing a computer readable recording medium having embodied thereon a computer program to execute a data transmission method including combining each of one or more data units transferred from an upper layer, with a field to indicate attribute information of the data unit, dividing the combined data units and fields into frame blocks of an identical size, and aggregating the divided frame blocks and transmitting the aggregated frame blocks as one frame to a PHY layer.

The foregoing and/or other aspects and utilities of the present general inventive concept may also be achieved by providing a method of transmitting data, the method including separating data units from a frame, according to a field to indicate attribute information of each of one or more data units included in the frame, and transmitting the separated data units.

The attribute information of the data unit may be a type of the data unit, and types of the one or more data units may be different from each other.

The attribute information of the data unit may be a size of the data unit, and sizes of the one or more data units may be different from each other.

The attribute information of the data unit may be a tagged time stamp (TTS) to indicate time related information of the data unit, and TTSs of the one or more data units may be different from each other.

The separating of the data unit from the frame and the transmitting of the separated data units may be performed in a convergence layer.

The separating of the data unit from the frame according to the field to indicate the attribute information of each of the one or more data units included in the frame may include removing a delimiter to indicate attribute information of each of frame blocks forming the frame, from the frame block.

The removing of the delimiter from the frame block may include removing a media access control (MAC) header including control information for the frame, from the frame.

The foregoing and/or other aspects and utilities of the present general inventive concept may also be achieved by providing a computer readable recording medium having embodied thereon a computer program to execute a data transmission method including separating data units from a frame, according to a field to indicate attribute information of each of one or more data units included in the frame, and transmitting the separated data units.

The foregoing and/or other aspects and utilities of the present general inventive concept may also be achieved by providing an apparatus to transmit data, the apparatus including a field combining unit to combine each of one or more data units with a field to indicate attribute information of the data unit, a division unit to divide the combined data units and fields into frame blocks of an identical size, and a transmission unit to aggregate the divided frame blocks and to transmit the aggregated frame blocks as one frame.

The foregoing and/or other aspects and utilities of the present general inventive concept may also be achieved by providing an apparatus to transmit data, the apparatus including a data unit separation unit, to separate the data unit from the frame according to a field to indicate attribute information of each of one or more data units included in a frame, and a transmission unit to transmit the separated data units.

The foregoing and/or other aspects and utilities of the present general inventive concept may also be achieved by providing a method including combining each of one or more data units transferred from an upper layer, with a field to indicate attribute information of each data unit; dividing the combined data units and fields into frame blocks of an identical size, and aggregating the divided frame blocks and transmitting the aggregated frame blocks as one frame to a PHY layer, separating data units from a frame according to a field to indicate attribute information of each of one or more data units included in the frame, and transmitting the separated data units.

The foregoing and/or other aspects and utilities of the present general inventive concept may also be achieved by providing an apparatus including a field combining unit to combine each of one or more data units with a field to indicate attribute information of the data unit, a division unit to divide the combined data units and fields into frame blocks of an identical size, a first transmission unit to aggregate the divided frame blocks and to transmit the aggregated frame blocks as one frame, a data unit separation unit to separate the data units from the one frame according to the field to indicate the attribute information of each of one or more data units included in the frame, and a second transmission unit to transmit the separated data units.

The foregoing and/or the other aspects of the present general inventive concept may also be achieved by providing a PLC network device including an apparatus to combine each of one or more data units with a field to indicate attribute information of each data unit, to divide the combined data units and fields into frame blocks of an identical size, and to aggregate the divided frame blocks to transmit the aggregated frame blocks as one frame.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 8A, 8B and 8C are diagrams illustrating fields forming a MAC header according to an embodiment of the present general inventive concept.

DETAILED DESCRIPTION OF THE PREFERRED EMBODIMENTS

Figure 1:
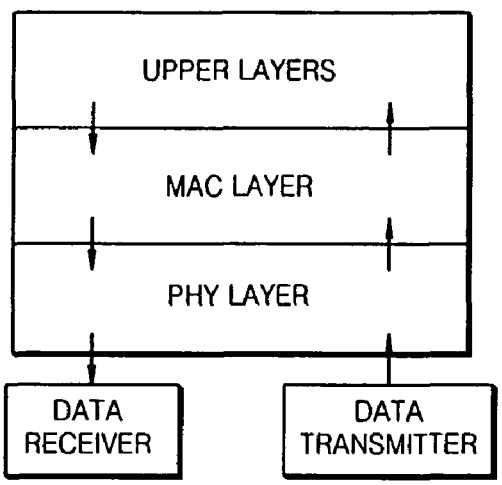
FIG. 1 is a schematic diagram of a path along which data is transmitted through a plurality of layers in a power line communication (PLC) network conventional.
Figure 2:
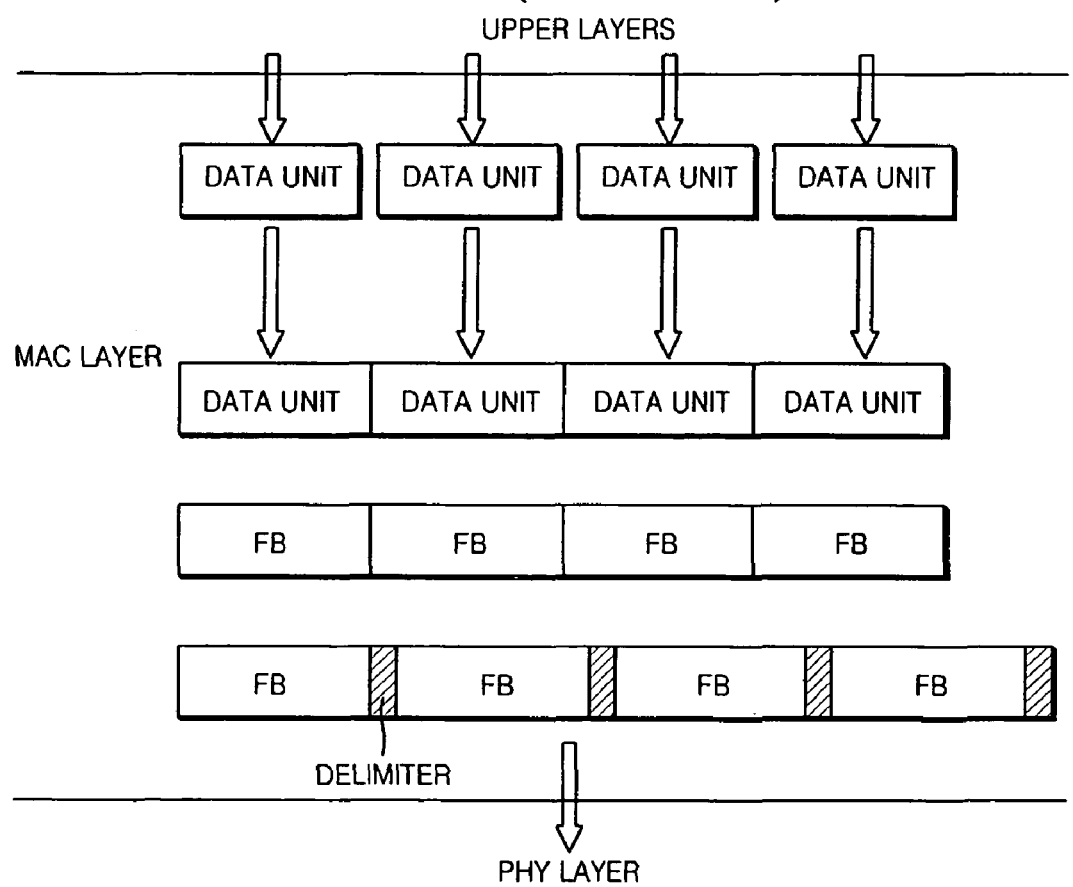
FIG. 2 is a diagram illustrating a conventional method of aggregating a predetermined number of data units transferred to a media access control (MAC) layer from upper layers and transferring the aggregated data units to a PHY layer in the conventional PLC network of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3A:
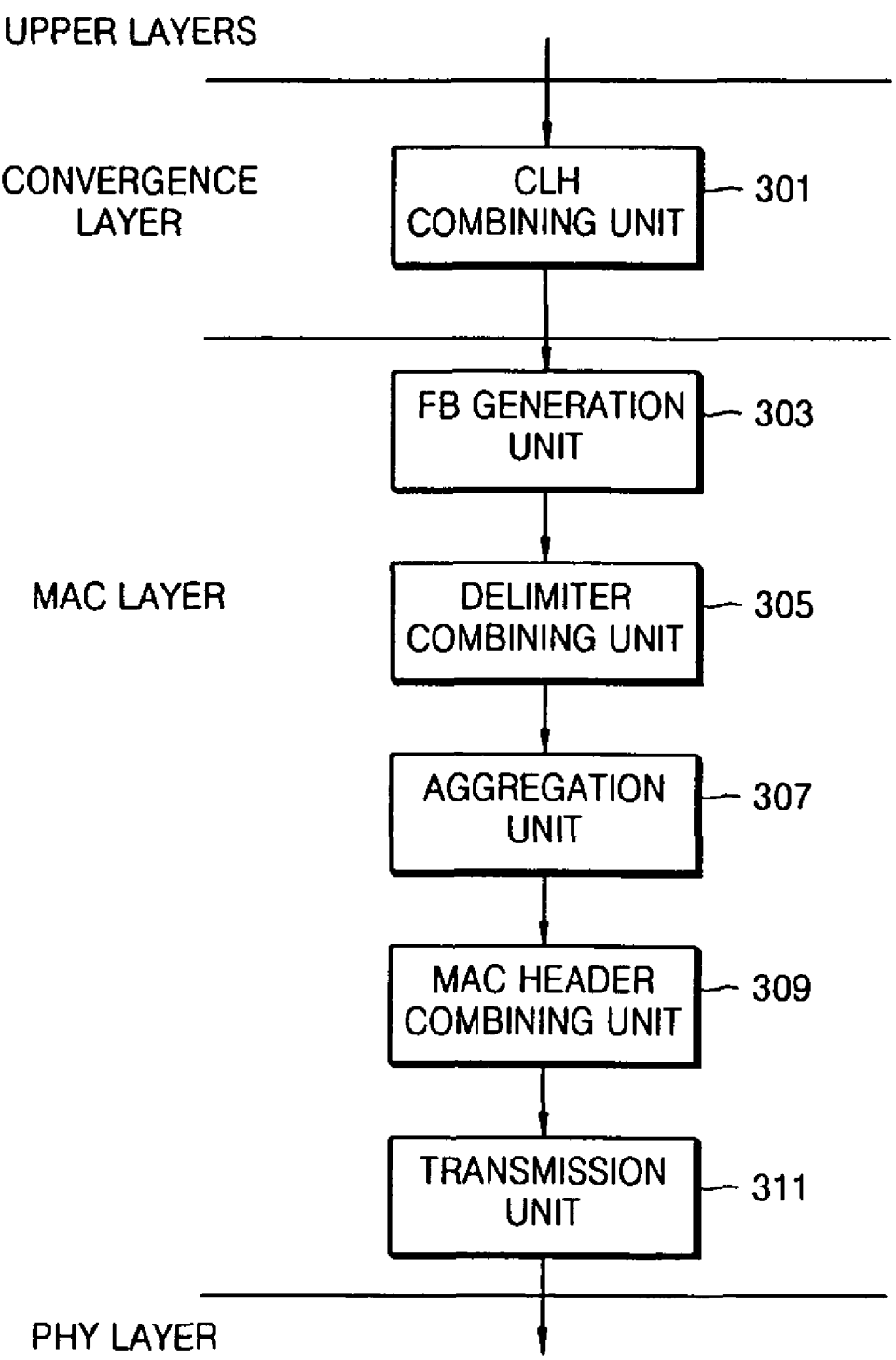
FIGS. 3A and 3B are diagrams illustrating apparatuses to transmit data in a PLC network according to an embodiment of the present general inventive concept.

FIG. 3A is a diagram illustrating an apparatus to transmit data from upper layers to a PHY layer in a power line communication (PLC) network according to an embodiment of the present general inventive concept. FIGS. 6A through 6D are diagrams illustrating a method of processing data in the apparatus illustrated in FIG. 3A according to an embodiment of the present general inventive concept. The apparatus of FIG. 3A may be a PLC network device to communicate with another apparatus to transmit and/or receive data therebetween. The another apparatus may be another PLC network device or a device disposed outside the PLC network to be allowed to communicate with the apparatus in the PLC network.

Figure 6A:
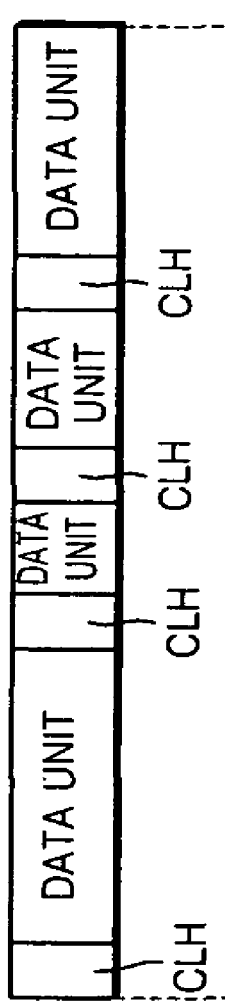
FIGS. 6A through 6D are diagrams illustrating a method of processing data in the apparatus and method of transmitting data illustrated in FIGS. 3A through 5 according to an embodiment of the present general inventive concept.

If a variety of types and sizes of data units are transferred from the upper layers to a convergence layer header (CLH) combining unit 301 in a convergence layer, the CLH combining unit 301 combines a CLH to each data unit. The CLH combining unit 301 may include a CLH generation unit to generate the CLH. The CLH generation unit separate from the CLH combining unit 301. The CLH includes fields related to attributes of the data unit, such as a type of a data unit, a size of a data unit, and a tagged time stamp (TTS) of the data unit. The TTS field indicates time relation information of the data unit, and includes information related to a data unit transmission time from a transmission server to a reception client, a data unit processing time from a server to a client, or a reproducing time. If data units combined with CLHs are combined with each other, the resulting shape will be as illustrated in FIG. 6A.

Figure 6B:
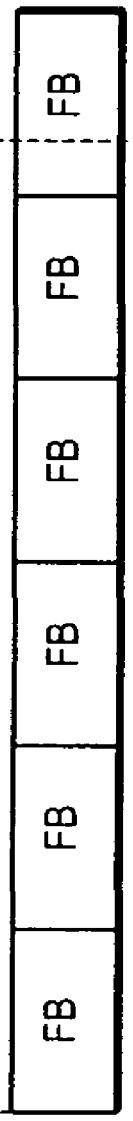

The CLHs and data units combined with each other are transferred to a frame block generation unit 330 in a MAC layer. The frame block generation unit 303 divides the CLHs and data units combined with each other into frame blocks of an identical size as illustrated in FIG. 6B. Then, the divided frame blocks are transferred to a delimiter combining unit 305, and the delimiter combining unit 305 combines a delimiter to each frame block. The delimiter combining unit 305 may include a delimiter generation unit the delimiter or a delimiter generation unit may be provided separately from the delimiter combining unit 305. The delimiter may include information related to a frame block, such as the number of a frame block to which the delimiter is combined, and CRC information.

Figure 6C:
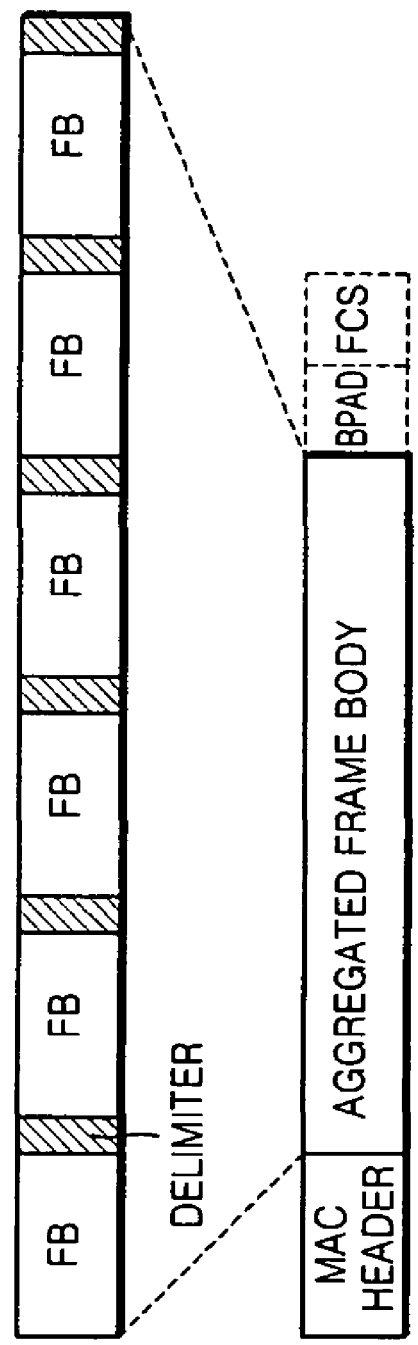

The frame blocks to which delimiters are combined are transferred to an aggregation unit 307 and a predetermined number of frame blocks are aggregated and an aggregate of frame blocks is formed as illustrated in FIG. 6C.

The aggregated frame blocks are transferred to a MAC header combining unit 309, and the MAC header combining unit 309 combines a MAC header to the aggregated frame blocks (or an aggregated frame body) and thus generates one frame. The MAC header combining unit 309 may include a MAC header generation unit to generate the MAC header. The MAC header generation unit may be provided separately from the MAC header combining unit 309. Then, the generated frame is transferred to a PHY layer. When necessary, a padding field (BPAD) or a CRC field (FCS) may be added to the frame. A transmission unit 311 transmits the frame to the PHY layer.

Figure 3B:
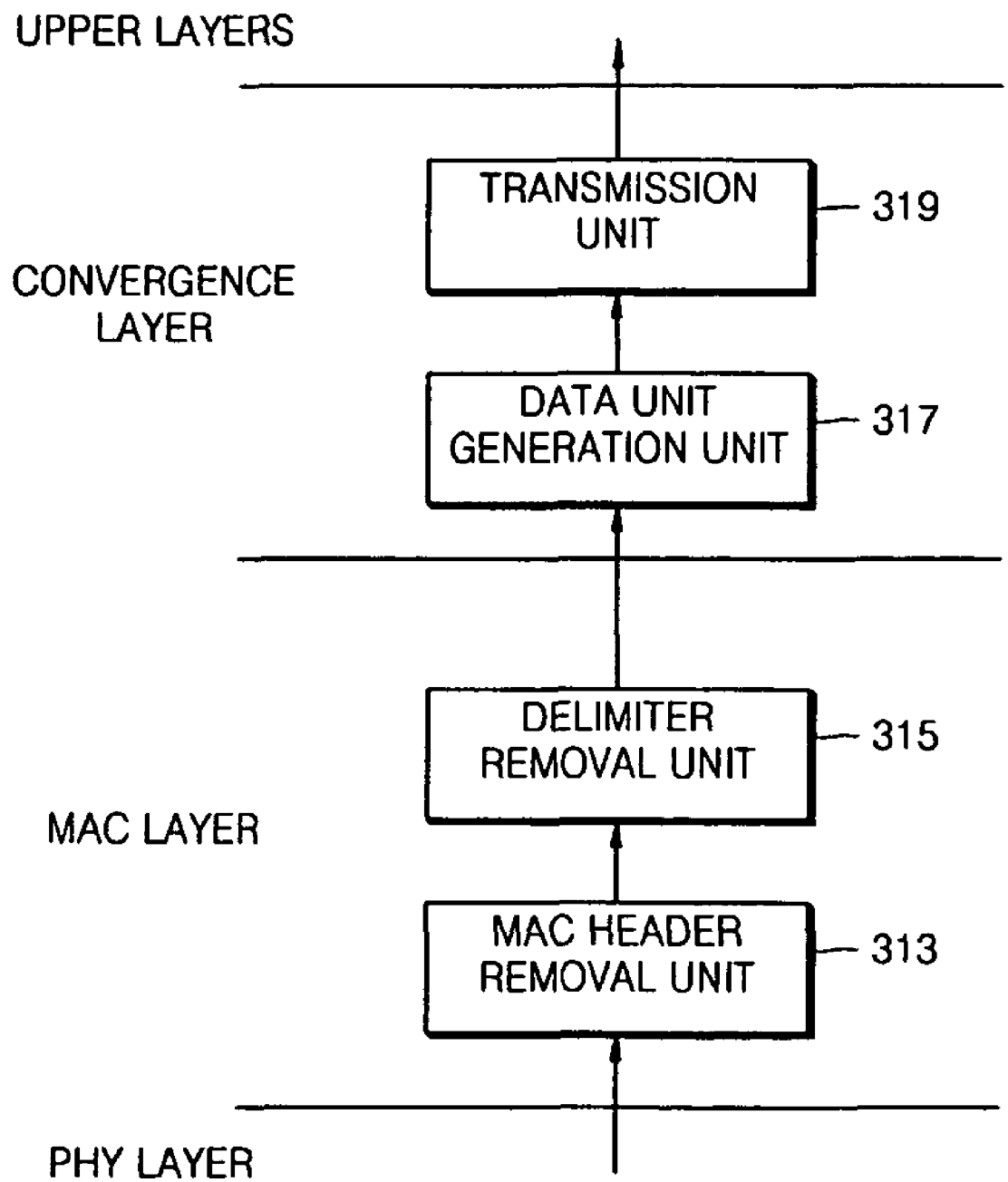

FIG. 3B is a diagram illustrating an apparatus to transmit data from a PHY layer to upper layers in a PLC network according to an embodiment of the present general inventive concept. FIGS. 6A through 6D illustrate data processed in the apparatus illustrated in FIG. 3B according to an embodiment of the present general inventive concept.

If a frame including a variety of types and sizes of data units are transferred from a PHY layer to a MAC header removal unit 313 in a MAC layer, the MAC header removal unit 313 removes a MAC header from the frame. The frame in which the MAC header is removed is transferred to a delimiter removal unit 315 in the MAC layer, and the delimiter removal unit 315 removes delimiters from the frame in which the MAC header is removed. The frame in which the MAC header and delimiters are removed is transferred to a data unit generation unit 317. The data unit generation unit 317 removes CLHs and separates data units from the frame, by referring to fields indicating attribution information of a data unit in each CLH included in the frame. The thus separated data units are transferred to upper layers.

Figure 4:
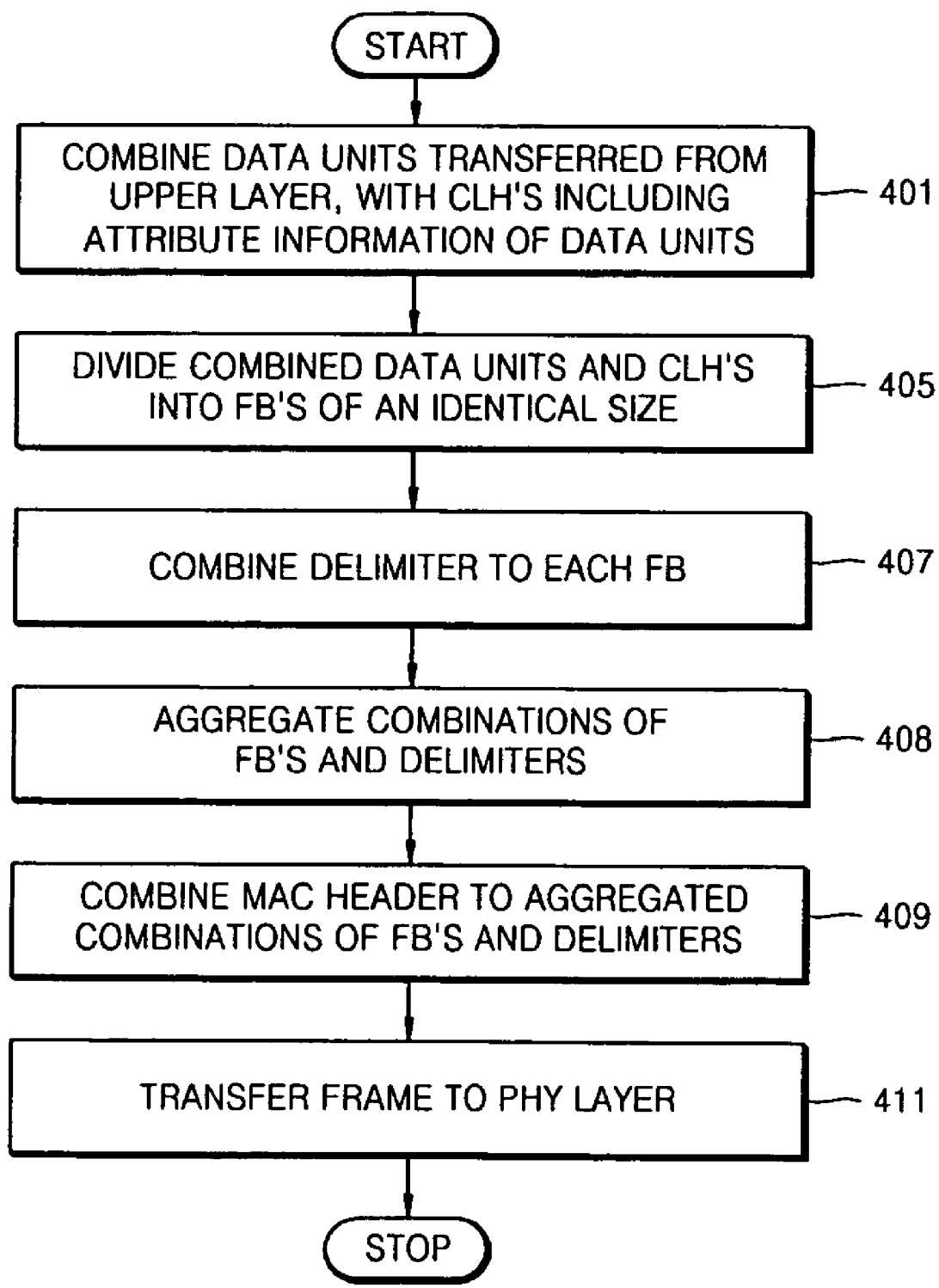
FIG. 4 is a flowchart illustrating a method of transmitting data from an upper layer to a PHY layer in a PLC network according to an embodiment of the present general inventive concept.

FIG. 4 is a flowchart illustrating a method of transmitting data from an upper layer to a PHY layer in a PLC network according to an embodiment of the present general inventive concept. FIGS. 6A through 6D illustrate data processed in the method of transmitting data illustrated in FIG. 4 according to an embodiment of the present general inventive concept.

If a variety of types and sizes of data units are transferred from upper layers to a convergence layer, a CLH is combined with each data unit in operation 401. The data units combined with CLHs are combined with each other as illustrated in FIG. 6A. The combined CLHs and data units are divided into frame blocks of an identical size in operation 405. Then, a delimiter is combined with each frame block in operation 407. A predetermined number of frame blocks to which delimiters are combined are aggregated and thus an aggregate of frame blocks is formed in operation 408. A MAC header is combined to the aggregated frame blocks and thus one frame is formed in operation 409. Then, the frame is transferred to the PHY layer in operation 411.

Figure 5:
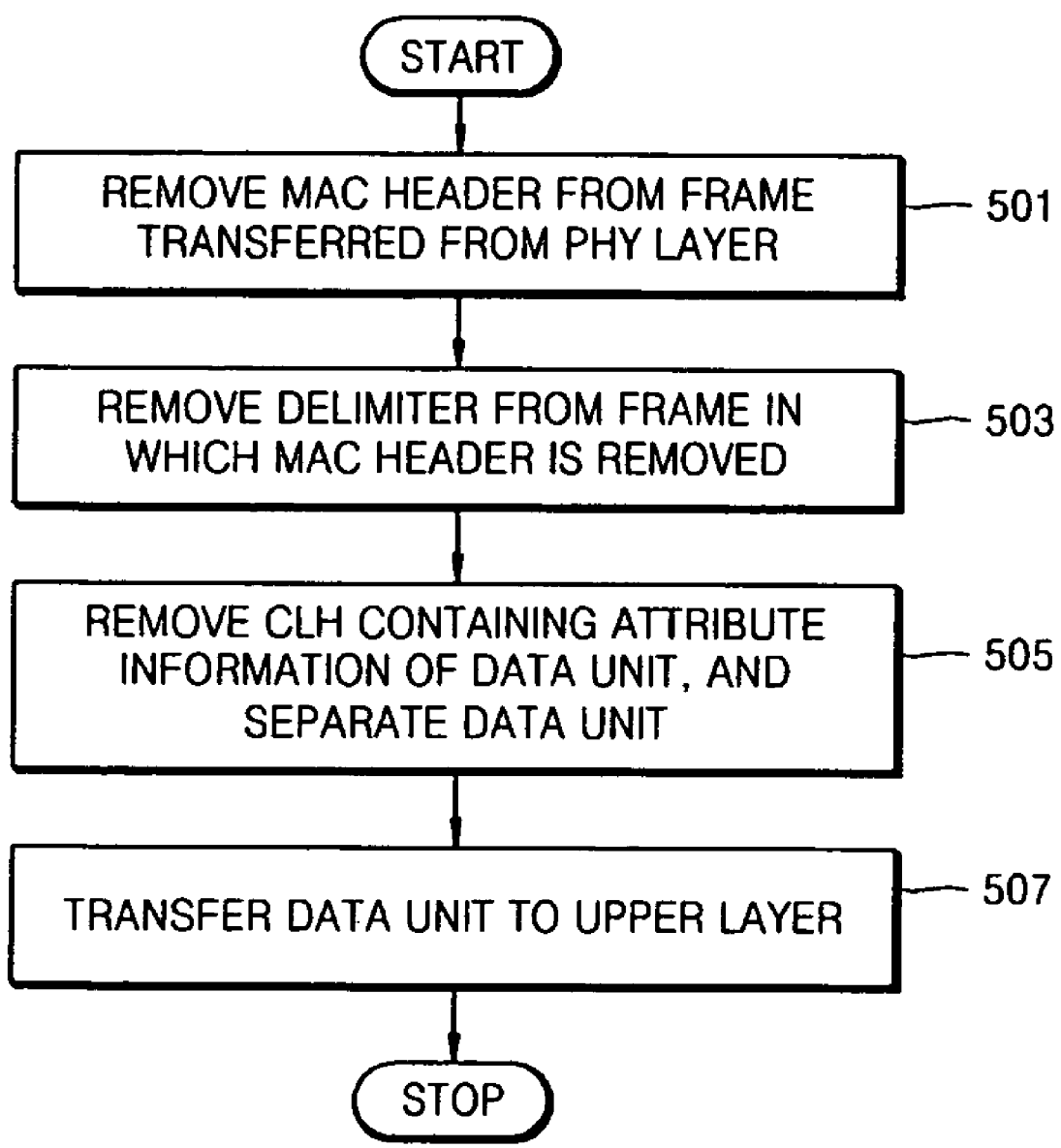
FIG. 5 is a flowchart illustrating a method of transmitting data from a PHY layer to an upper layer in a PLC network according to an embodiment of the present general inventive concept.

FIG. 5 is a flowchart illustrating a method of transmitting data from a PHY layer to an upper layer in a PLC network according to an embodiment of the present general inventive concept. FIGS. 6A through 6D illustrate data processed in the method of transmitting data illustrated in FIG. 5 according to an embodiment of the present general inventive concept.

If a variety of types and sizes of data units are transferred from the PHY layer to a MAC layer, a MAC header is removed from the frame in operation 501. Delimiters are removed from the frame in which the MAC header is removed, in operation 503. By referring to fields indicating attribute information of a data unit in each CLH included in the frame, CLHs are removed and thus data units are separated in operation 505. The thus generated data units are transferred to upper layers in operation 507.

Figure 7A:
FIGS. 7A and 7B are diagrams illustrating fields of a convergence layer header (CLH) and a delimiter according to an embodiment of the present general inventive concept.

FIG. 7A is a diagram specifically illustrating one or more fields of a CLH according to an embodiment of the present general inventive concept. As described above, the CLH contains information on a data unit. More specifically, the CLH includes an information field for a type of the data unit, an information field for a size of the data unit, and a time information field related to the data unit, such as a TTS field. Here, the TTS field indicates time related information of a data unit, and includes information related to a data unit transmission time from a transmission server to a reception client, a data unit processing time from a server to a client, or a reproducing time. When the server transmitting the data unit and the client receiving this exist, and the client receiving the data unit retransmits the received data unit to another client, the TTS can be effectively used. That is, since the TTS field includes information on a transmission time, processing time or reproducing time of the data unit, by referring to this field, another client receiving the data unit retransmitted by the client can more efficiently set timing for processing or reproducing the retransmitted data unit. In this way, a jitter problem can be handled more effectively.

Figure 7B:
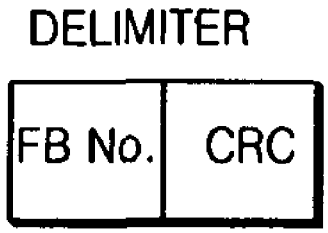

FIG. 7B is a diagram specifically illustrating one or more fields of a delimiter according to an embodiment of the present general inventive concept. As described above, the delimiter contains information related to a frame block. More specifically, the delimiter includes the number of a frame block and CRC information.

Figure 6D:

FIGS. 8A, 8B, and 8C are diagrams illustrating fields to form a MAC header according to an embodiment of the present general inventive concept. As illustrated in FIG. 6D, the MAC header is combined with an aggregate of frame blocks, and the MAC header may include a frame control field, a unit control field, a header check sequence (HCS) field as illustrated in FIG. 8A. FIG. 8B illustrates subfields to form the frame control field included in the MAC header. The frame control field may include a protocol version field to indicate a version of a protocol, a frame type field to indicate a type of a frame, an ACK policy field, and a unit control type field. The unit control type field included in the frame control field may have at least two or more values (for example, '0' and '1'). According to the value in the unit type control field, the control type of the unit control field is determined. For example, if the unit control type field value is '0', the type of the unit control field is determined as a fragmentation control type and thus the data unit is transmitted individually. If the unit control type field value is '1', the type of the unit control field is determined as an aggregation control type and thus data units are aggregated and then transmitted.

FIG. 8C illustrates subfields to form a unit control field in detail when the unit control type field value is '0' and thus the type of the unit control field is determined as a fragmentation control type. In this case, the unit control field includes subfields, such as a data unit number field, a fragment number field, a field for last fragment information, and a block ACK request field.

FIG. 8C also illustrates subfields to form a unit control field in detail when the unit control type field value is '1' and thus the type of the unit control field is determined as an aggregation control type. In this case, the unit control field includes subfields, such as a frame number field, a field including the number of frame blocks included in a frame, and a block ACK request field. Here, the block ACK request field is a field to request transmission of a block ACK when frames are continuously transmitted as illustrated in FIG. 9.

Figure 9:
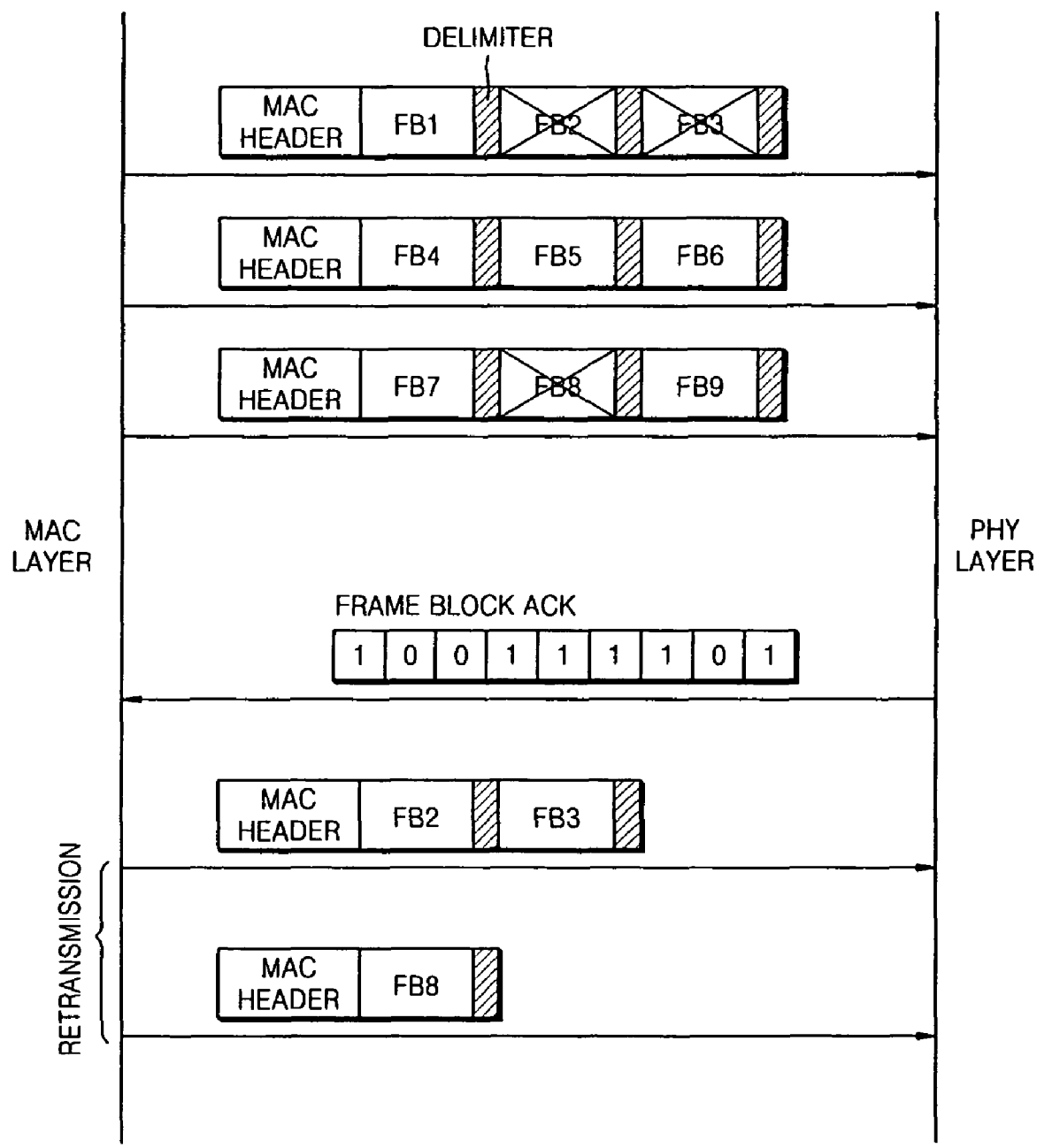
FIG. 9 is a diagram illustrating retransmission of frame blocks in which errors occur when frames are transmitted from a MAC layer to a PHY layer according to an embodiment of the present general inventive concept.

FIG. 9 is a diagram illustrating retransmission of frame blocks in which errors occur when frames are transmitted from a MAC layer to a PHY layer according to an embodiment of the present general inventive concept. Referring to FIG. 9, three frames which each include three frame blocks are transferred from the MAC layer to the PHY layer. Here, it is assumed that when CRC information is checked in the PHY layer and the result indicates that errors have occurred in the three frame blocks, FB 2, FB 3, and FB 8. Then, a frame block ACK is transmitted from the PHY layer to the MAC layer in order to indicate that the errors have occurred in the frame blocks, FB 2, FB 3, and FB 8. Referring to FIG. 9, the frame block ACK is written as '1, 0, 0, 1, 1, 1, 1, 0, 1'. Since the second, third, and eighth bits are '0', this indicates that errors have occurred in FB 2, FB 3, and FB 8. The MAC layer receiving this frame block ACK retransmits frames including the frame blocks, FB 2, FB 3, and FB 8, in which errors occurred, to the PHY layer. Though FIG. 9 illustrates only a configuration in which only frame blocks where errors occurred are selected, a frame is generated with these frame blocks and the frame is retransmitted. However, a configuration in which the whole frame including the frame blocks where errors occurred being retransmitted is also available.

The present general inventive concept can also be embodied as computer-readable codes on a computer-readable recording medium to perform the above-described methods. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

According to the present general inventive concept, by aggregating a variety of types and sizes of data units transferred from upper layers as one frame and transmitting the frame, efficiency of transmission is enhanced. That is, since a variety of types and sizes of data units are aggregated and transmitted at a time, a time loss due to ACK required for individually transmitting each data unit can be prevented.

Also, according to the present general inventive concept, a variety of types of interfaces can be provided with respect to upper layers and an individual convergence layer with respect to each interface can be formed.

Furthermore, according to the present general inventive concept, by introducing a layer concept when a frame is generated, generation of a frame is stratified (convergence layer, MAC layer) and thus complexity of implementation can be decreased and use efficiency of a data payload can be increased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of transmitting data, the method comprising:
combining each of one or more data units transferred from an upper layer, with a field to indicate attribute information of each data unit, wherein the data units have a variety of sizes, the one or more data units combined with the fields are combined with each other;
dividing the combined data units and fields into frame blocks of an identical size;
combining a delimiter to each of the frame blocks;
aggregating the divided frame blocks to which delimiters are combined;
combining a Media Access Control (MAC) header to the aggregated combinations of the frame blocks and the delimiters to form one frame; and
transmitting the one frame to a PHY layer.

2. The method of claim 1, wherein the attribute information of the data unit comprises a type of each data unit, and types of the one or more data units are different from each other.

3. The method of claim 1, wherein the attribute information of the data unit comprises a size of each data unit, and sizes of the one or more data units are different from each other.

4. The method of claim 1, wherein the attribute information of the data unit comprises a tagged time stamp (TTS) to indicate time related information of each data unit, and TTSs of the one or more data units are different from each other.

5. The method of claim 1, wherein:
the combining of the data unit with the field to indicate the attribute information of the data unit is performed in a convergence layer; and
the dividing of the combined data units and fields into the frame blocks of the identical size, the aggregating of the divided frame blocks and the transmitting of the aggregated frame blocks as the one frame to the PHY layer are performed in a media access control (MAC) layer.

6. The method of claim 1, wherein the dividing of the combined data units and fields into frame blocks of identical size further comprises combining a delimiter to indicate the attribute information of each frame block to the each frame block.

7. The method of claim 1, wherein the aggregating of the divided frame blocks and the transmitting of the aggregated frame blocks as the one frame to the PHY layer comprises combining a MAC header including control information for a frame, with the one frame.

8. A non-transitory computer readable recording medium having embodied thereon a computer program for executing a method, the method comprising:
combining each of one or more data units transferred from an upper layer, with a field to indicate attribute information of each data unit, wherein the data units have a variety of sizes, the one or more data units combined with the fields are combined with each other;
dividing the combined data units and fields into frame blocks of an identical size; and
combining a delimiter to each of the frame blocks;
aggregating the divided frame blocks to which delimiters are combined;
combining a Media Access Control (MAC) header to the aggregated combinations of the frame blocks and the delimiters to form one frame; and
transmitting one frame to a PHY layer.

9. An apparatus to transmit data, comprising:
a field combining unit to combine each of one or more data units with a field to indicate attribute information of each data unit, wherein the data units have a variety of sizes, and wherein the one or more data units combined with the fields are combined with each other;
a division unit to divide the combined data units and fields into frame blocks of an identical size;
a delimiter combining unit to combine a delimiter to each of the frame blocks;
an aggregation unit to divided frame blocks to which delimiters are combined;
a Media Access Control (MAC) header combining unit to combine a header to the aggregated combinations of the frame blocks and the delimiters to form one frame; and
a transmission unit to transmit the one frame.

10. A method of transmitting data, the method comprising:
combining each of one or more data units transferred from an upper layer, with a field to indicate attribute information of each data unit, wherein the data units have a variety of sizes, and wherein the one or more data units combined with the fields are combined with each other;
dividing the combined data units and fields into frame blocks of an identical size;
combining a delimiter to each of the frame blocks;
aggregating the divided frame blocks to which delimiters are combined;
combining a Media Access Control (MAC) header to the aggregated combinations of the frame blocks and the delimiters to form one frame; and
transmitting the one frame to a PHY layer;
separating the data units from the one frame according to the field to indicate attribute information of each data unit included in the frame; and
transmitting the separated data units.

11. An apparatus to transmit data, comprising:
a field combining unit to combine each of one or more data units with a field to indicate attribute information of each data unit, wherein the data units have a variety of sizes, and wherein the one or more data units combined with the fields are combined with each other;

a division unit to divide the combined data units and fields into frame blocks of an identical size;

a delimiter combining unit to combine a delimiter to each of the frame blocks;

an aggregation unit to divided frame blocks to which delimiters are combined;

a Media Access Control (MAC) header combining unit to combing a header to the aggregated combinations of the frame blocks and the delimiters to form one frame;

a first transmission unit to transmit the one frame;

a data unit separation unit to separate the data units from the one frame according to the field to indicate the attribute information of each data unit included in the frame; and a second transmission unit to transmit the separated data units.

* * * * *